United States Patent [19]

Maeda

[11] Patent Number: 4,855,759
[45] Date of Patent: Aug. 8, 1989

[54] LASER SCANNING WITH AN ELASTIC NIP ROLLER

[75] Inventor: Yutaka Maeda, Isehara, Japan

[73] Assignee: Minolta Camera Kabushiki Kaisha, Osaka, Japan

[21] Appl. No.: 237,625

[22] Filed: Aug. 26, 1988

Related U.S. Application Data

[63] Continuation of Ser. No. 81,136, Aug. 3, 1987, abandoned.

[30] Foreign Application Priority Data

Aug. 2, 1986 [JP] Japan .............................. 61-119124[U]

[51] Int. Cl.$^4$ .......................... G01D 9/42; G01D 15/24
[52] U.S. Cl. .................................... 346/108; 346/134; 400/638
[58] Field of Search ........... 346/108, 134, 160, 107 R; 400/638, 639, 641; 358/296, 300, 302

[56] References Cited

U.S. PATENT DOCUMENTS

| | | | |
|---|---|---|---|
| 3,519,117 | 7/1970 | Smith | 400/641 |
| 4,179,601 | 12/1979 | Tarumi et al. | 219/216 Ph |
| 4,492,455 | 1/1985 | Kawai et al. | 355/3 R |
| 4,665,408 | 5/1987 | Toriumi | 346/134 |
| 4,698,650 | 10/1987 | Watanabe | 346/134 |

FOREIGN PATENT DOCUMENTS 0146813  7/1985  European Pat. Off.

*Primary Examiner*—E. A. Goldberg
*Assistant Examiner*—Mark Reinhart
*Attorney, Agent, or Firm*—Wenderoth, Lind & Ponack

[57] ABSTRACT

The present invention relates to a laser scanning apparatus, which includes a drivingly rotatable subscanning drum and at least one nipping roller rotatable by the drum in pressing contact therewith and having an outer peripheral surface provided by an elastic member. The drum and the roller have their axes spaced at a constant distance from each other at all times for transporting a sheet when nipped therebetween, so that the sheet, while being transported, can be scanned with a laser beam in a direction perpendicular to the direction of transport of the sheet.

6 Claims, 6 Drawing Sheets

LASER SCANNING WITH AN ELASTIC NIP ROLLER

This application is a continuation of now abandoned application Ser. No. 081,136 filed 8/3/87, now abandoned.

BACKGROUND OF THE INVENTION

1. Field of the Invention

The present invention relates to a laser scanning apparatus for use in image recording systems for recording an image on a sheet, image reading systems for reading an image on a sheet and the like, and more specifically to a laser scanning apparatus for causing a laser beam to scan a sheet in a direction perpendicular (the main scanning direction) to the direction of transport of the sheet (the subscanning direction) while the sheet is being transported, thereby recording an image on the sheet or reading an image on the sheet.

2. Description of the Prior Art

The following apparatus are generally known as such laser scanning apparatus.

Unexamined Japanese Patent Publication No. SHO 58-6660 discloses an apparatus comprising a drivingly rotatable subscanning drum and a rotatable nipping roller which are arranged with their axes disposed at a variable distance from each other. A sheet is fed to and positioned between the drum and the roller which are spaced apart at first, and the two members are thereafter pressed against each other to nip the sheet therebetween, whereupon the image on the sheet is scanned in the main scanning direction by a laser beam while the sheet is being transported in the subscanning direction by the rotation of the drum.

Another apparatus is known which comprises a subscanning drum and a nipping roller biased into pressing contact with the drum at all times by a spring or the like. A sheet is fed to the nip between the two members and is transported while being held therebetween.

Such image scanning apparatus must fulfill the requirement that the sheet transport speed be maintained at a constant value with extremely high accuracy, whereas the above-mentioned conventional apparatus are subject to the following problems.

In the laser scanning apparatus disclosed in the above-mentioned publication No. SHO 58-6660, the nipping roller which is at rest and spaced from the subscanning drum is brought into pressing contact with the rotating drum, with the sheet interposed therebetween, so that the resulting impact vibrates the drum, the sheet and the nipping roller. The nipping roller which is begins rotating further produces variations in the drum rotating torque. These phenomena vary the sheet transport speed which should be constant, producing irregularities in the density of scanning lines or in recording or reading spacing at the leading end portion of the sheet immediately after the start of scanning thereby causing disturbed images or images of impaired quality to be formed. Furthermore, the apparatus requires a complex mechanism, for example, for positioning the sheet.

The other of the foregoing apparatus wherein a spring or the like is used is subject to similar problems because the sheet forced into nipping engagement with the subscanning drum and the nipping roller vibrates the spring due to the elasticity thereof.

SUMMARY OF THE INVENTION

The main object of the invention is to provide a laser scanning apparatus wherein sheets can be transported at a constant speed at all times.

Another object of the invention is to provide a laser scanning apparatus wherein the sheet to be transported need not be positioned in place.

Another object of the invention is to provide a laser scanning apparatus which has a simple construction and in which sheets can be transported at a constant speed at all times.

Another object of the invention is to provide a laser scanning apparatus which is adapted to scan sheets or images along lines at a constant spacing and to produce images of improved quality.

These and other objects of the present invention can be achieved by a laser scanning apparatus which comprises a drivingly rotatable subscanning drum and at least one nipping roller rotatable by the drum in pressing contact therewith and having an outer peripheral surface provided by an elastic member, the drum and the roller having their axes arranged at a constant distance from each other at all times for transporting a sheet nipped therebetween, so that the sheet, while being transported, is scanned with a laser beam in a direction perpendicular to the direction of transport of the sheet.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the invention will be described below with reference to the drawings.

Figure 1:
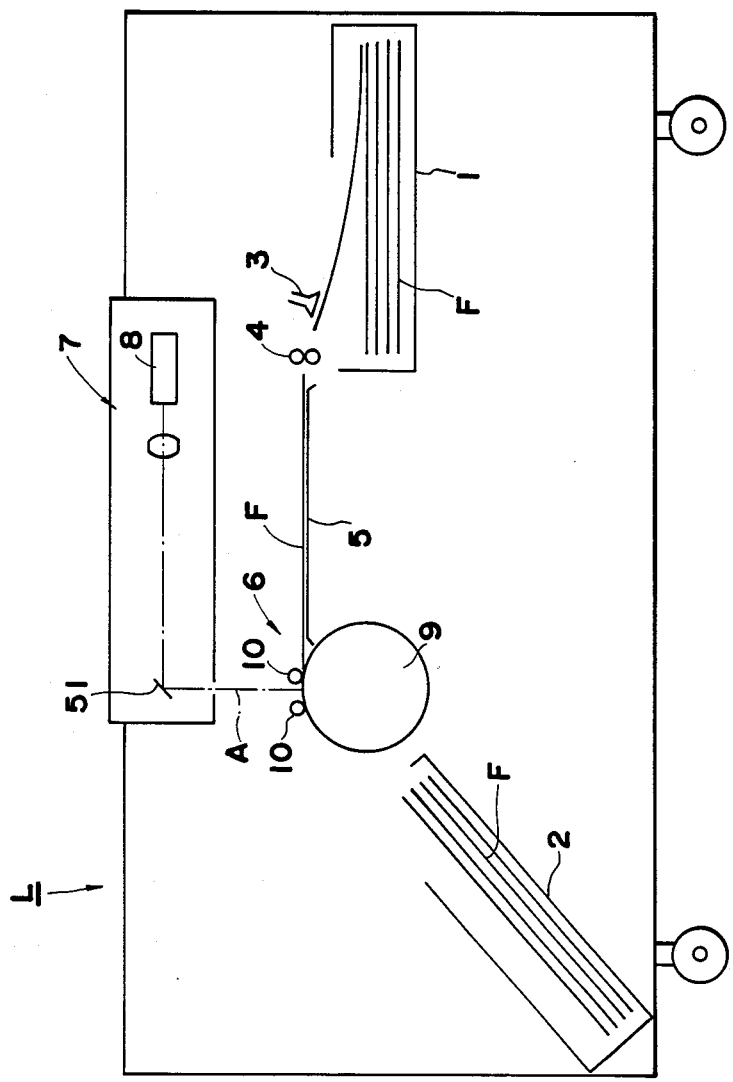
FIG. 1 is a sectional view schematically showing an image recording system embodying the invention.

FIG. 1 is a sectional view schematically showing the construction of an image recording system L including a laser scanning apparatus embodying the invention. Indicated at 1 in this drawing is a supply magazine holding therein a stack of photosensitive film sheets F, such as silver salt film sheets. Indicated at 2 is a receiving magazine for accommodating the film sheets F after each sheet has been exposed to light for recording an image at the exposure station to be described later. Arranged between the supply magazine 1 and the receiving magazine 2 are a plurality of suction disks 3, a pair of transport rollers 4, a guide plate 5 and a transport assembly 6. The suction disks 3 are arranged widthwise of the film sheets F and are connected to unillustrated suction means for attracting uppermost one of the film sheets F in the supply magazine 1 thereto one by one to feed each sheet to the nip of the pair of transport rollers 4. The two transport rollers are arranged one above the other; the lower roller, which is a drive roller, drives the upper roller in contact therewith. The film sheet F transported by the transport rollers 4 is guided by the guide plate 5 to the transport assembly 6, which in turn receives the film sheet F from the guide plate 5 and further transports the sheet F at a stable constant speed. An optical box 7 provided at an upper portion of the main body of the image recording system L directs a laser beam on the film sheet F and records an image thereon while the film sheet F is being transported by the assembly 6. The construction of the transport assembly 6 will be described later in detail.

Figure 2:
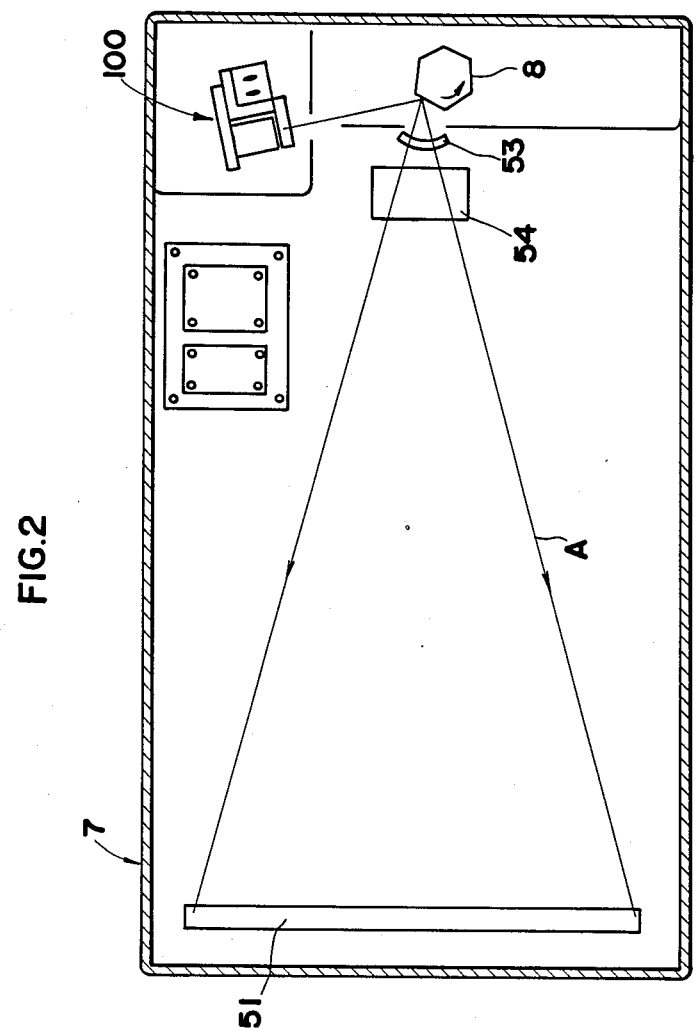
FIG. 2 is a plan view showing an optical assembly included in the image recording system of FIG. 1.

FIG. 2 is a plan view showing an arrangement of optical elements within the optical box 7.

Figure 3:
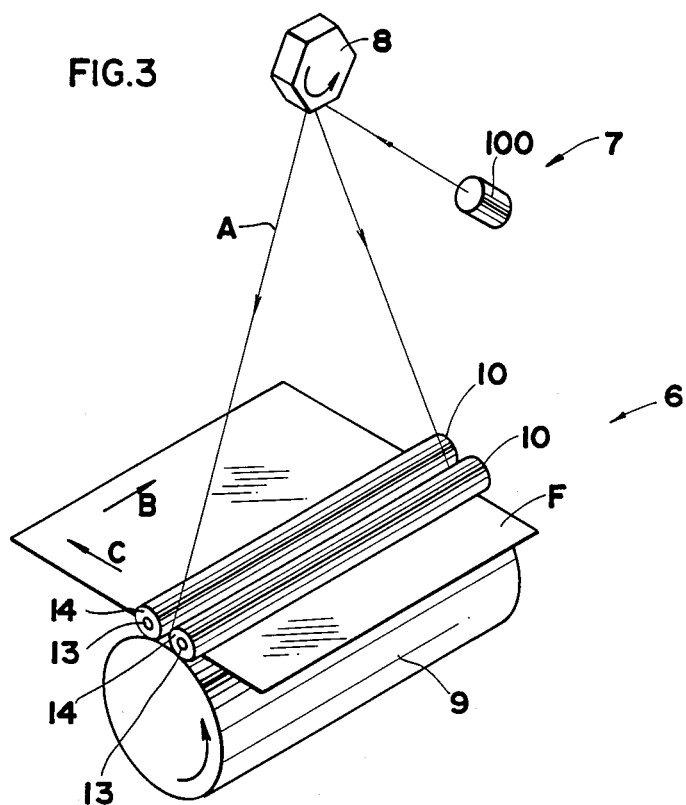
FIG. 3 is a perspective view showing a film sheet transport assembly included in the image recording system of FIG. 1, a lens, mirror, etc. being omitted from FIG. 3 for clarity.

The laser beam emitted from a laser beam generator 100 is modulated based on an image signal received from an unillustrated host system. The laser beam emitted by the generator 100 is reflected and swept by a polygon mirror 8 rotating at a high speed passed through a toroidal lens 53 and an fθ lens 54, and is reflected downward by a mirror 51 so as to be directed on the film sheet F being transported by the transport assembly 6. Stated more specifically with reference to the perspective view of FIG. 3 showing the transport assembly 6, the film sheet F is scanned with the laser beam A in the main scanning direction B perpendicular to the direction of transport of the film sheet (subscanning direction C), whereby the contemplated image is recorded from portion to portion on the film sheet F being transported in the direction C. For clarity, the lenses 53, 54 and the mirror 51 are not shown in the perspective view of FIG. 3.

The image recording system L having the above-described construction operates as follows.

The unillustrated suction means causes the suction disks 3 to lift a film sheet F from the supply magazine 1 by attraction, and guides the film sheet F to the pair of transport rollers 4, which in turn feeds the sheet F to the transport assembly 6 along the guide plate 5. While being transported by the assembly 6 in the subscanning direction C, the film sheet F is scanned in the main scanning direction B with the laser beam A emitted from the optical box 7, whereby an image is formed on the film sheet F. The film sheet F bearing the desired image thus recorded thereon falls into the receiving magazine 2 and is stored therein.

While the image recording system L has been generally described above, the transport assembly 6 will be described below in detail.

As already described, the transport assembly 6, which is disposed in the main scanning position for film sheets F, is adapted to transport each film sheet F in nipping engagement therewith in the subscanning direction C. It is required 6 that the transport speed of the assembly 6 be maintained at a constant value with extremely high precision. The transport assembly 6 comprises a subscanning drum 9 and a pair of nipping rollers 10, 10.

Figure 4:
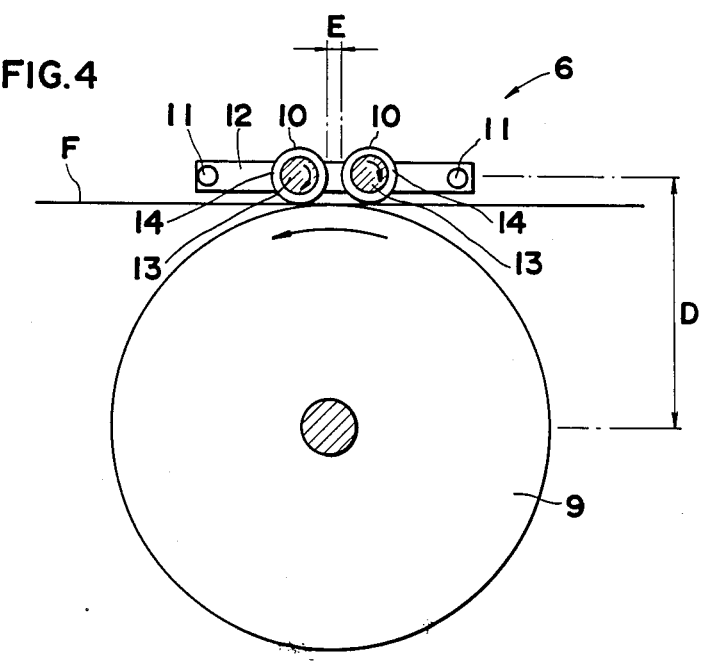
FIG. 4 is a sectional view showing the film sheet transport assembly of the system shown in FIG. 1.
Figure 5:
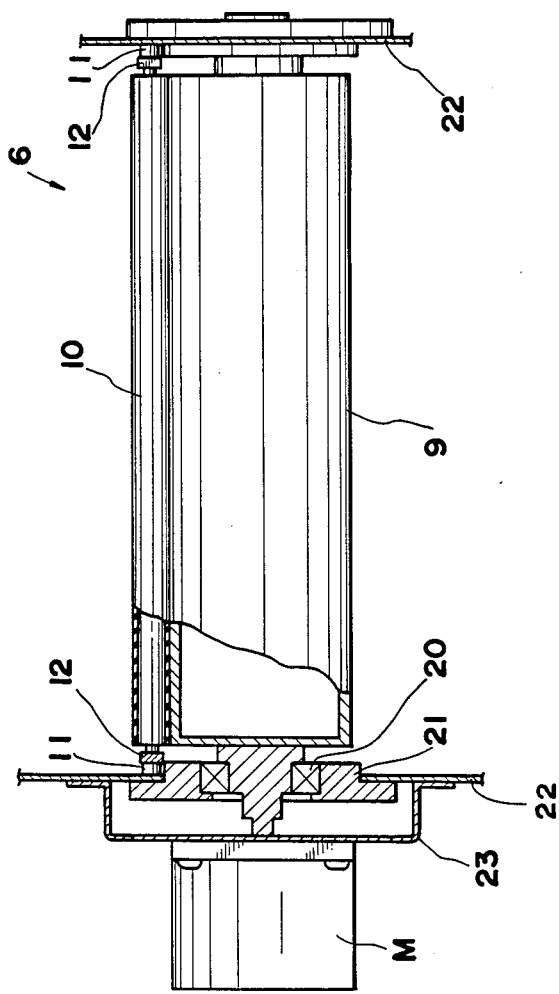
FIG. 5 is partial sectional view of the film sheet transport assembly of the system shown in FIG. 1.
Figure 6:
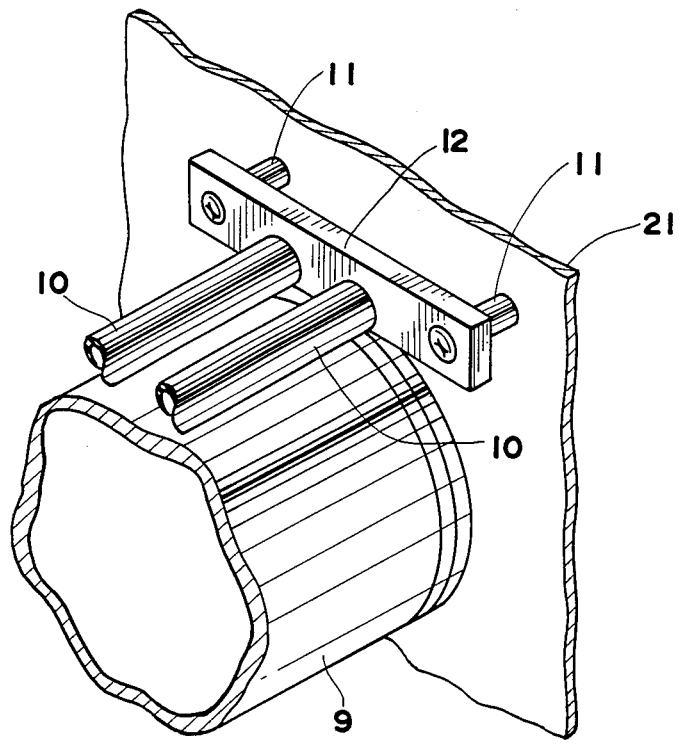
FIG. 6 is a fragmentary perspective view of the film sheet transport assembly shown in FIGS. 3 to 5.

The subscanning drum 9 is made of a hard material such as metal, is disposed between main body frames 22, 22 of the image recording system L and is supported by bearings 20 and bearing holders 21 on these frames. A motor M is attached to one of the frames 22 by a mount plate 23 and has a drive shaft coupled to the shaft of the drum 9 for driving the drum 9. The nipping rollers 10, 10 have a smaller diameter than the subscanning drum 9 and are held in pressing contact with the drum 9, with the axes of the rollers disposed at a fixed distance D from the axis of the drum 9. The nipping rollers 10, 10 are rotatable under the rotation of the subscanning drum 9. As shown in FIGS. 4 to 6, the nipping rollers 10, 10 are rotatably supported at their opposite ends by support plates 12, 12, which are held to the frames 22, 22, respectively, by pins 11. The above-mentioned distance D from the axis of the subscanning drum 9 to the axes of the nipping rollers 10, 10 is slightly smaller than the sum of the radii of the drum 9 and the nipping roller 10 by a value corresponding to the amount of deformation of the elastic member 14 (to be described below) always produced as the result of the pressing contact of the roller 10 with the drum 9. The two nipping rollers 10, 10 are spaced parallel spaced apart with a predetermined clearance E defined therebetween. In the clearance E defined between the rollers, the film sheet is scanned in the main scanning direction B with the laser beam A.

Figure 7:
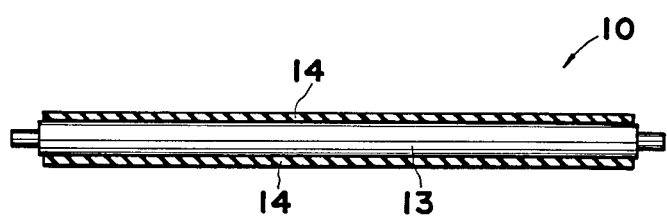
FIG. 7 is a sectional view showing a nipping roller constituting the film sheet transport assembly of FIGS. 3 to 5.

With reference to the sectional view of FIG. 7, the nipping roller 10 comprises a core 13 and an elastic member 14 covering the outer periphery of the core 13 and forming the outer surface of the roller 10. The elastic member 14 is made of a material, such as foam rubber, which has a hardness capable of accommodating the thickness of the film sheet F to be nipped between the rollers. More specifically, the material, wall thickness, etc. of the nipping roller 10 are determined according to the thickness, width and transport speed of the film sheet F. For example, when the film sheet F has a thickness of 0.18 mm and a width of 356 mm and is transported at a speed of 50 mm/sec, it is desirable that the nipping roller 10 be 14 mm in diameter and that the elastic member 14 have a wall thickness of 2 mm and be made of ethylene-propylene rubber expanded twofold in volume.

In the transport assembly 6 described above, the nipping rollers 10, 10 are always in pressing contact with the subscanning drum 9 with the axis-to-axis distance D maintained constant and are rotated by the drum 9 clockwise in FIG. 4 at all times. If the nipping rollers 10, 10 were positioned away from the drum 9 and brought into pressing contact therewith, these members and the film sheet F would be subjected to vibration, whereas the assembly 6 of the present invention is free of such vibration. Furthermore, if the nipping rollers 10, 10 were at rest and began rotating, variations would occur in the drum rotating torque, but the drum 9 of the assembly 6 of the present invention is free of such torque variations.

Although the film sheet F, when fed, is forced into nipping engagement with the subscanning drum 9 and the nipping rollers 10, 10, the thickness of the film sheet F is almost accomodated within the elastic members 14, 14 of the rollers 10, 10 due to the deformation thereof. This renders the subscanning drum 9, the nipping rollers 10, 10 and the film sheet F substantially free of the vibration or torque variation due to the forced engagement.

Thus, the vibration, as well as the torque variation, resulting from the forced engagement of the film sheet F is nearly negligible. Furthermore, the elastic member providing the outer peripheral surface of each nipping roller effectively attenuates the vibration unlike the aforementioned spring or the like conventionally used. The elastic member immediately attenuates vibration if any, while the vibration due to its elasticity poses no problem.

In this way, the transport assembly 6 having a simple construction transports the film sheet F in the subscanning direction C at a speed which is held constant with extremely high precision.

In the present embodiment illustrated, the leading end of the film sheet F is fed to one of the nipping rollers 10 and then to the nip of the other nipping roller and the drum 9, whereupon the laser beam A starts scanning the sheet F in the main scanning direction B.

Since the laser beam thus scans the film sheet F and thereby records an image thereon while the sheet F is being transported at a constant speed, the image formed has a very high quality even at the leading end portion of the sheet.

The present invention is not limited to the foregoing embodiment but can also embody modifications as will be described below.

Figure 8:
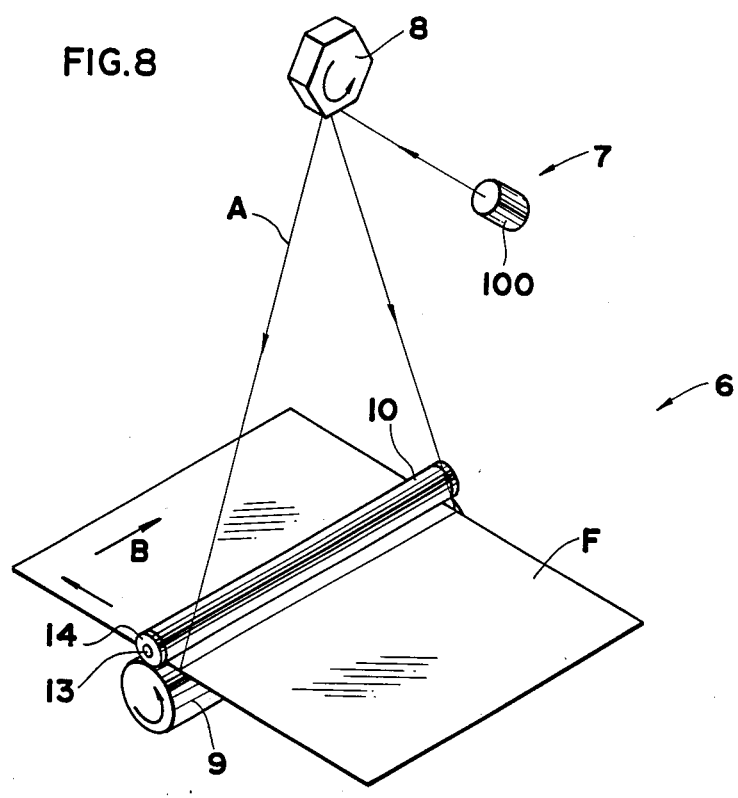
FIG. 8 is a perspective view showing a second embodiment of the invention, i.e., another film sheet transport assembly, a lens, mirror, etc. being omitted from FIG. 8 as in FIG. 3.
Figure 9:
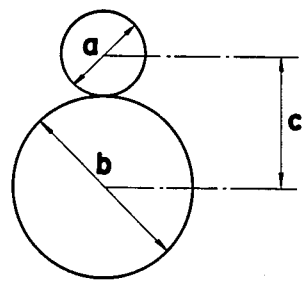
FIG. 9 is a diagram showing the sizes and arrangement of the rollers included in the second embodiment of FIG. 8.

First, the transport assembly 6 may comprise a single nipping roller 10 instead of the two nipping rollers 10 of the above-described embodiment, and a subscanning drum 9 having a smaller diameter than the drum of the first embodiment, as seen in FIG. 8. The film sheet F is then scanned with the laser beam A immediately in front of or to the rear of the nipping roller 10. In this case, the transport assembly 6 preferably has the dimensions given below with reference to FIG. 9. The diameter a of the nipping roller 10 is 14±0.05 mm; the diameter b of the subscanning drum 9 is 30±0.05 mm; the axis-to-axis distance c between the roller and the drum is 21.8 mm; and the wall thickness of the elastic member (rubber) of the nipping roller 10 is 2 mm and is reduced by about 10% when the elastic member is compressed by the pressing contact between the roller and the drum. During the transport of the film sheet F, the thickness of the film sheet F then compresses the elastic member by up to 20% of its wall thickness. With the exception of these features, the present embodiment is the same as the first embodiment with respect to its construction and the function and operation of the parts.

Second, a roll of film may be used instead of the film sheets F described in embodiments above. The image recording system is then adapted to scan the roll film for recording images thereon during the transport of the film.

Third, while the transport assembly 6 described above is for use in image recording systems wherein sheets are scanned for recording images thereon, the transport assembly is of course also usable for image reading systems wherein images are read from sheets by scanning.

Although the present invention has been fully described by way of examples with reference to the accompanying drawings, it is to be noted that various changes and modifications will become apparent to those skilled in the art. Therefore, unless such changes and modifications depart from the scope of the present invention, they should be construed as being included therein.

What is claimed is:

1. A laser scanning apparatus comprising:
a drum rotatably mounted in the apparatus about an axis of rotation fixed in the apparatus;
at least one idle roller rotatably mounted in the apparatus about an axis of rotation fixed in the apparatus relative to the axis of rotation of said drum, each said at least one idle roller contacting said drum so as to be driven by said drum when said drum rotates for transporting a sheet when nipped between said drum and said roller in a sheet transporting direction,
the fixed axis of rotation of said drum and the fixed axis of rotation of said idle roller extending parallel to one another so that a predetermined distance is maintained therebetween;
laser beam generating means for generating a laser beam; and
scanning means for causing the generated laser beam to scan the transported sheets in a direction perpendicular to said sheet transporting direction.

2. A laser scanning apparatus as claimed in claim 1, wherein said drum has an outer peripheral surface comprised of a hard material, and each said at least one idle roller has an outer peripheral surface comprised of an elastic member.

3. A laser scanning apparatus as claimed in claim 1, wherein said predetermined distance is slightly less than the sum of the radii of said drum and said idle roller by an amount corresponding to the elasticity of said elastic member.

4. A laser scanning apparatus comprising:
frame means;
a supply magazine for holding a stack of sheets therein;
feeding means for feeding the sheets from said supply magazine one at a time;
transporting means for transporting sheets fed by said feeding means along a predetermined path; and
an exposure portion for receiving sheets from said transporting means and for exposing the received sheets,
said exposure portion including a drum rotatably mounted to said frame means about an axis of rotation fixed relative to said frame means, at least one idle roller rotatably mounted to said frame means about an axis of rotation fixed relative to said frame means and contacting said drum so as to be driven by said drum when said drum rotates for transporting the received sheets in a sheet transporting direction, laser beam generating means for generating a laser beam, and scanning means for causing the generated laser beam to scan the transported sheets in a direction perpendicular to said sheet transporting direction,
the fixed axis of rotation of said drum and the fixed axis of said idle roller extending parallel to one another so that a predetermined distance is maintained therebetween.

5. A laser scanning apparatus as claimed in claim 4, wherein said drum has an outer peripheral surface comprised of a hard material, and each said at least one idle roller has an outer peripheral surface comprised of an elastic member.

6. A laser scanning apparatus as claimed in claim 5, wherein said predetermined distance is slightly less than the sum of the radii of said drum and said idle roller by an amount corresponding to the elasticity of said elastic member.

* * * * *